(No Model.)
J. M. STIMPSON
Sink Strainer.
No. 243,648. Patented June 28, 1881.
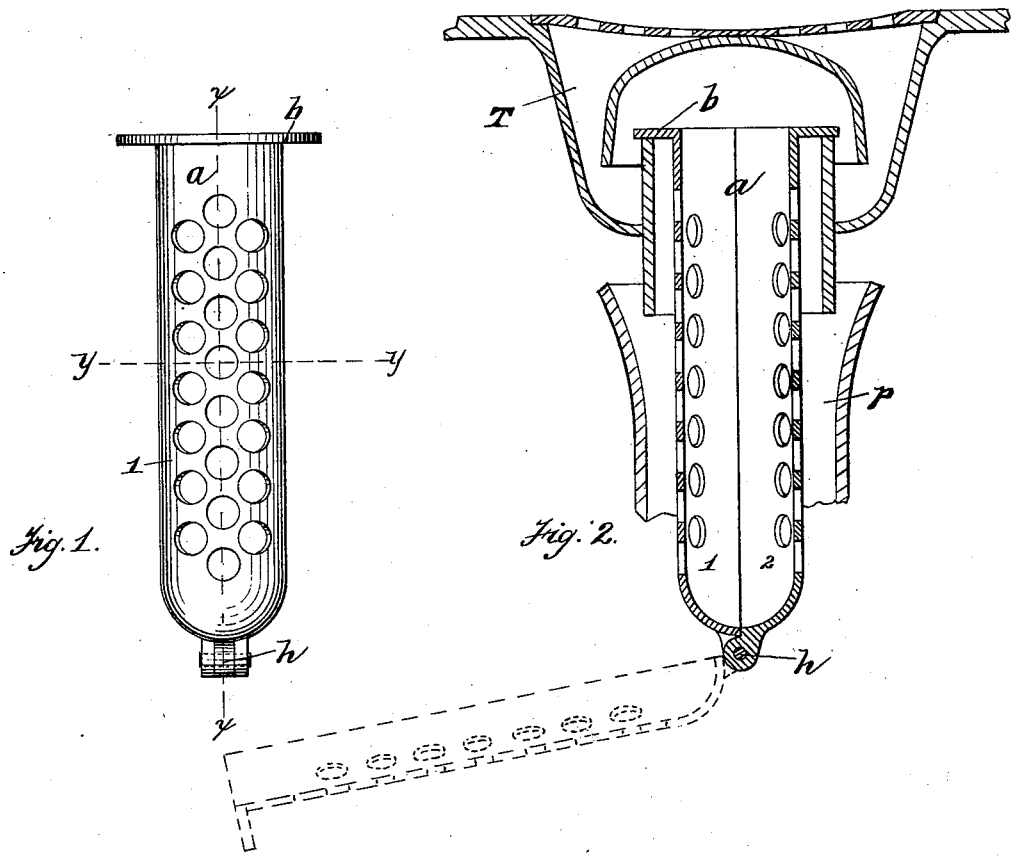
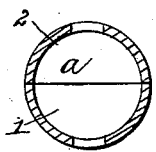
Witnesses:
H. G. Wadlin.
D. B. Marion.
Inventor:
John M. Stimpson,
by Wright & Brown.
Attys.

UNITED STATES PATENT OFFICE.

JOHN M. STIMPSON, OF BOSTON, MASSACHUSETTS, ASSIGNOR OF ONE-HALF TO GEORGE B. HARRIMAN, OF SAME PLACE.

SINK-STRAINER.

SPECIFICATION forming part of Letters Patent No. 243,648, dated June 28, 1881.

Application filed May 26, 1881. (No model.)

*To all whom it may concern:*

Be it known that I, JOHN M. STIMPSON, of Boston, in the county of Suffolk and State of Massachusetts, have invented certain Improvements in Sink-Strainers, of which the following is a specification.

This invention relates to removable strainers for the drain-pipes of sinks and other like receptacles, to arrest solid matter and prevent it from escaping into the drain-pipe.

The invention has for its object to provide a removable strainer adapted to be easily applied and removed, to be used for a considerable length of time without being cleaned, and to be conveniently cleaned when occasion requires.

To these ends my invention consists in a strainer composed of a perforated flanged tube, adapted to be inserted in a sink drain-pipe below the usual bell strainer, and made in two longitudinal sections adapted to be separated when the strainer is removed from the pipe, so that accumulations of solid matter may be readily removed.

Of the accompanying drawings, forming a part of this specification, Figure 1 represents a side view of a strainer embodying my invention. Fig. 2 represents a section on line $x\,x$, Fig. 1, showing the strainer in place in a drain-pipe below the bell strainer. Fig. 3 represents a section on line $y\,y$, Fig. 1.

The same letters of reference indicate the same parts in all the figures.

In the drawings $a$ represents my improved strainer, which is a perforated tube of metal open at one end and provided with a flange, $b$. The tube is so proportioned that it can be inserted in a sink drain-pipe, $p$, below the ordinary bell strainer, T, without completely filling said pipe, a space being left between the pipe and strainer for the passage of liquid from the strainer, as shown in Fig. 2. The diameter of the flange is greater than that of the drain-pipe, so that the flange will support the strainer within the pipe. The perforations of the strainer are sufficient in size and number to allow the liquids to escape freely. The strainer is divided longitudinally into two separable sections, 1 2, and said sections are connected at the lower end of the strainer by a hinge, $h$, so that when removed from the drain-pipe the strainer may be opened, as shown in dotted lines, Fig. 2, for the convenient removal of accumulations of solid matter.

It is obvious that this device constitutes a very convenient and useful strainer, adapted to be used for a considerable length of time without removal for cleansing, its depth being such that it will contain a quantity of solid matter before being seriously clogged, while its sectional construction enables it to be cleansed most readily.

It is well known that the ordinary bell-strainer retards the passage of liquids to such an extent that servants are very liable to remove it and allow all the matter in the sink to escape, so that the drain-pipe often becomes clogged.

My improved strainer (which does not interfere with the bell strainer when the latter is used) allows the liquids to escape so freely that there is no occasion for removing it until it is filled with solid matter.

My improved strainer is applicable to drain-pipes of wash-bowls and any receptacles from which water flows into drain-pipes.

I am aware that a perforated flanged tube has heretofore been used as a strainer for cesspools; but I am the first, so far as I am aware, to make such a strainer in separable sections and adapted to be placed in the waste-pipe of a sink below the bell strainer.

I claim—

The improved strainer herein described, composed of a flanged perforated tube made in separable sections, substantially as and for the purpose specified.

In witness whereof I have signed my name to this specification, in the presence of two subscribing witnesses, this 20th day of May, A. D. 1881.

JOHN M. STIMPSON.

Witnesses:
C. F. BROWN,
DANIEL MORRISON.